United States Patent
Ni et al.

(10) Patent No.: US 10,234,172 B2
(45) Date of Patent: Mar. 19, 2019

(54) LOCALIZED SOLAR COLLECTORS

(71) Applicant: Massachusetts Institute of Technology, Cambridge, MA (US)

(72) Inventors: George Ni, Ann Arbor, MI (US); Gang Chen, Carlisle, MA (US); Svetlana V. Boriskina, Winchester, MA (US); Thomas Alan Cooper, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/283,914

(22) Filed: Oct. 3, 2016

(65) Prior Publication Data

US 2017/0038097 A1    Feb. 9, 2017

Related U.S. Application Data

(63) Continuation-in-part of application No. 14/479,307, filed on Sep. 6, 2014, now Pat. No. 9,459,024.
(Continued)

(51) Int. Cl.
*B32B 5/18* (2006.01)
*B32B 5/32* (2006.01)
(Continued)

(52) U.S. Cl.
CPC ............... *F24S 20/50* (2018.05); *B32B 5/18* (2013.01); *B32B 5/32* (2013.01); *C08L 83/02* (2013.01);
(Continued)

(58) Field of Classification Search
CPC .. F24S 20/50; F24S 10/17; B32B 5/32; B32B 5/18
See application file for complete search history.

(56) References Cited

U.S. PATENT DOCUMENTS

| 4,785,633 A | 11/1988 | Meijer et al. ............... 60/641.15 |
| 8,962,190 B1 | 2/2015 | Gross et al. .................. 429/233 |

(Continued)

FOREIGN PATENT DOCUMENTS

| BE | 876720 A | 10/1979 | ................ F24J 2/28 |
| CN | 102674490 A | 9/2012 | |

(Continued)

OTHER PUBLICATIONS

International Searching Authority, Invitation to Pay Additional Fees and, Where Applicable, Protest Fee, and Partial International Search, Application No. PCT/US2017/018942, 19 pages, dated Nov. 28, 2017.
(Continued)

*Primary Examiner* — Hai Vo
(74) *Attorney, Agent, or Firm* — Sunstein Kann Murphy & Timbers LLP

(57) ABSTRACT

A localized heating structure includes a spectrally-selective solar absorber, that absorbs incident solar radiation and reflects at wavelengths longer than 2 μm, with an underlying heat-spreading layer having a thermal conductivity equal to or greater than 50 W/(mK), a thermally insulating layer, adjacent to the spectrally-selective solar absorber, having a thermal conductivity of less than 0.1 W/(mK), one or more evaporation openings through the spectrally-selective solar absorber and the thermally insulating layer, and an evaporation wick, disposed in one or more of the evaporation openings in the thermally insulating layer, that contacts liquid and allows the liquid to be transported from a location beneath the thermally insulating layer through to the spectrally-selective solar absorber in order to generate vapor from the liquid. The thermally insulating layer is configured to have a density less than the liquid so that the localized heating structure is able to float on the liquid.

16 Claims, 10 Drawing Sheets

Related U.S. Application Data

(60) Provisional application No. 62/298,802, filed on Feb. 23, 2016, provisional application No. 62/369,478, filed on Aug. 1, 2016, provisional application No. 61/874,390, filed on Sep. 6, 2013.

(51) Int. Cl.
| | |
|---|---|
| *F22B 1/00* | (2006.01) |
| *C08L 83/02* | (2006.01) |
| *F24S 10/17* | (2018.01) |
| *F24S 10/80* | (2018.01) |
| *F24S 20/25* | (2018.01) |
| *F24S 20/50* | (2018.01) |
| *F24S 70/10* | (2018.01) |
| *F24S 80/00* | (2018.01) |
| *F24S 80/56* | (2018.01) |
| *F24S 80/65* | (2018.01) |
| *F24S 90/00* | (2018.01) |

(52) U.S. Cl.
CPC .............. *F22B 1/006* (2013.01); *F24S 10/17* (2018.05); *F24S 10/80* (2018.05); *F24S 20/25* (2018.05); *F24S 70/10* (2018.05); *F24S 80/65* (2018.05); *F24S 90/00* (2018.05); *B32B 2266/06* (2013.01); *F24S 80/56* (2018.05); *F24S 2080/014* (2018.05); *Y02E 10/44* (2013.01); *Y10T 29/49826* (2015.01); *Y10T 428/249967* (2015.04); *Y10T 428/249969* (2015.04)

(56) References Cited

U.S. PATENT DOCUMENTS

| | | |
|---|---|---|
| 9,459,024 B2 | 10/2016 | Ghasemi et al. |
| 2002/0061396 A1 | 5/2002 | White .................. 428/293.4 |
| 2005/0287421 A1 | 12/2005 | Simon et al. .................. 429/44 |
| 2007/0141343 A1 | 6/2007 | Miller et al. .................. 428/408 |
| 2009/0098383 A1 | 4/2009 | Brown et al. ................. 428/408 |
| 2010/0035081 A1 | 2/2010 | Clasen et al. |
| 2011/0091713 A1 | 4/2011 | Miller et al. ............... 428/312.2 |
| 2011/0120451 A1 | 5/2011 | Miles ........................... 126/635 |
| 2015/0226456 A1 | 8/2015 | Miles |

FOREIGN PATENT DOCUMENTS

| | | | |
|---|---|---|---|
| DE | 3214421 A1 | 10/1983 | .............. E04B 1/74 |
| DE | 3933848 A1 | 4/1991 | |
| DE | 4406365 A1 | 8/1995 | |
| DE | 102004028621 A1 | 12/2005 | |
| DE | 102009022932 A1 | 12/2010 | ................ F24J 2/28 |
| RU | 2515041 C1 | 5/2014 | |
| WO | 2009135398 A1 | 11/2009 | |
| WO | 2015035271 A1 | 3/2015 | |

OTHER PUBLICATIONS

International Searching Authority, International Search Report and Written Opinion, International Application No. PCT/US2017/018942, 22 pages, dated Mar. 9, 2018.

International Searching Authority, International Search Report—International Application No. PCT/US2014/054440, dated Feb. 5, 2015 together with the Written Opinion of the International Searching Authority, 12 pages.

LOCALIZED SOLAR COLLECTORS

CROSS-REFERENCE TO RELATED APPLICATIONS

This patent application claims the benefit of U.S. Provisional Patent Application No. 62/298,802 filed Feb. 23, 2016 and U.S. Provisional Patent Application No. 62/369,478 filed Aug. 1, 2016. This patent application is also a continuation-in-part of U.S. patent application Ser. No. 14/479,307 filed Sep. 6, 2014, now U.S. Pat. No. 9,459,024, which claims the benefit of U.S. Provisional Patent Application No. 61/874,390 filed Sep. 6, 2013. The disclosures of the above applications and patent are incorporated by reference herein in their entirety.

STATEMENT REGARDING FEDERALLY SPONSORED RESEARCH OR DEVELOPMENT

This invention was made with Government support under Contract Nos. DE-SC0001299 and DE-FG02-09ER46577 awarded by the Department of Energy and under Contract No. FA9550-11-1-0174 awarded by the Air Force Office of Scientific Research. The Government has certain rights in the invention.

TECHNICAL FIELD

The present invention relates to structures that promote localized heating, and more specifically to structures that promote the heating and phase change of liquids for use with evaporation systems, solar collectors and other heating systems to harvest solar energy.

BACKGROUND ART

Solar irradiation is a promising source of renewable energy, as the hourly incident solar flux on the surface of the earth is greater than the annual global energy consumption. This resource is utilized in a variety of applications divided mostly into two main areas: photovoltaics and photo-thermal applications. Photo-thermal applications for harvesting solar energy currently suffer from low efficiency and require high concentrations of sunlight, which add complexity and cost to the solar energy harvesting systems. These applications are divided into three categories: low, medium, and high temperature. Currently, low and medium temperature applications are limited to small-scale residential and commercial use. In high temperature applications, concentrated solar power (CSP) systems have recently been used to produce steam with the temperature of approximately 450° C. The superheated steam drives a heat engine (efficiency of 35-40%) to generate electricity. The thermal efficiency ($\eta_{th}$) of these systems are defined as $$\eta_{th} = \frac{\dot{m} h_{LV}}{C_{opt} q_i} \quad (1)$$

where $\dot{m}$ denotes the mass flow rate, $h_{LV}$ total enthalpy of liquid-vapor phase change, $C_{opt}$ the optical concentration, and $q_i$ the direct solar irradiation.

Solar collectors are one type of system to harvest low-temperature solar energy. In these collectors, working fluid (mostly water) flows through a solar panel to absorb irradiated power. These collectors are divided into two groups: surface and volumetric collectors. Conventional surface-based solar collectors (e.g., those which use a black surface to absorb sunlight and transfer the thermal energy to the adjacent working fluid) have a typical efficiency, $\eta_{th}$, of 52%. Volumetric collectors have been recently proposed and utilize nanofluids—fluids seeded with nanoparticles—to harvest solar energy. A range of nanoparticles (NPs) and fluids are considered for these collectors. For example, Otanicar et al. in "Nanofluid-based direct absorption solar collector," *Journal of Renewable and Sustainable Energy* 2, 033102 (2010) used nanofluids of carbon nanotubes (CNT), graphite, and silver NPs in these solar collectors. The $\eta_{th}$ efficiency of 55% and 57% was achieved with graphite and silver NPs, respectively. Tyagi et al. in "Predicted Efficiency of a Low-Temperature Nanofluid-Based Direct Absorption Solar Collector," *Journal of Solar Energy Engineering* 131, 041004 (2009) showed 10% increase in $\eta_{th}$ of solar collectors by using Al NPs-water as the working fluid. The enhanced efficiency of volumetric collectors compared to the surface collectors is attributed to three factors: higher absorbance of nanofluids due to NPs, uniform temperature in the fluid, and enhanced thermal conductivity of nanofluid. If NPs smaller than the mean free path of the bulk material are used, the absorption spectrum is typically broadened with no change in absorption peak leading to enhanced absorption efficiency. The measured absorbance of these nanofluids can reach 95% and the rest is the reflectance. However, the critical drawback of these systems is the high portion of heat loss by convection which is between 28-41% as measured by Otanicar et al., mentioned above. This limitation puts a cap on further development of volumetric collectors. In both surface and volumetric collectors, nearly half of the absorbed energy is dissipated to the surrounding medium and is converted to low-quality energy. This suggests new approaches are needed to minimize the dissipated heat in order to boost the photo-thermal efficiency of the solar collectors.

With another approach, localization of thermal energy is suggested to drive a thermally-activated phenomenon. Local heating of NPs is achieved through illumination by electromagnetic waves (e.g., generally, lasers). The local temperature rise around these NPs is used for a range of applications. For example, Sershen et al. in "Temperature-sensitive polymer-nanoshell composites for photothermally modulated drug delivery," *Journal of Biomedical Materials Research* 51, 293-298 (2000) utilized the photo-thermal local heating for drug-delivery. Specifically, Au NPs in a microgel structure show enhanced temperatures with laser illumination and cause a collapse in the surrounding hydrogel matrix. The burst leads to the release of any soluble material held in the hydrogel. Lowe et al. in "Laser-induced temperature jump electrochemistry on gold nanoparticle-coated electrodes," *Journal of the American Chemical Society* 125, 14258-9 (2003) locally heated the surface of gold nanoparticle-coated indium tin oxide (ITO) electrodes in an electrolyte solution. The induced temperature rise impacts the open-circuit potential of the electrode. Jones and Lyon in "Photothermal patterning of microgel/gold nanoparticle composite colloidal crystals," *Journal of the American Chemical Society* 125, 460-5 (2003) introduced local photo-thermal heating for phase-change of a microgel/gold nanoparticle composite colloid. By illuminating with a laser resonant with Au plasmon absorption, they introduced local heating to cause a crystalline-amorphous phase change in the microgel matrix. In these approaches, high-quality energy is introduced locally to drive a physical or chemical phenomenon.

For surface plasmon (SP) induced heating, Govorov et al. developed a model to predict maximum temperature rise at the surface of plasmonic NPs as $$T = T_\infty + \frac{R_{NP}^2}{3k} \frac{\omega}{8\pi} \mathrm{Re}\left(\frac{3\varepsilon_0}{2\varepsilon_0 + \varepsilon_{NP}}\right)^2 \mathrm{Im}(\varepsilon_{NP}) \frac{8\pi I_0}{c\sqrt{\varepsilon_0}} \quad (2)$$

where $T_\infty$ denotes the temperature of the medium, $R_{NP}^2$ the radius of the NP, k the thermal conductivity of the medium, $\omega$ the frequency of the incident wave, $\varepsilon_0$ dielectric constant of the medium, $\varepsilon_{NP}$ dielectric constant of the NP, $I_0$ the intensity of the electromagnetic wave in the medium, and c the speed of light. This equation suggests that $(T-T_\infty) \propto R_{NP}^2$. Keblinski et al. in "Limits of localized heating by electromagnetically excited nanoparticles," *Journal of Applied Physics* 100, 054305 (2006) studied the limit of the global temperature rise of a NP under illumination by electromagnetic waves. They solved the diffusive heat equation with constant heat flux at the surface of the NP. In the liquid and amorphous phases due to lack of crystallinity, the mean free path is on the order of atomic distances and consequently the applicability of the diffusive heat equation at the nanoscale is justified. The maximum temperature rise on the NP is given by $$T = T_\infty + \frac{C_{opt} q_i \sigma_p}{4\pi \kappa r_{np}} \quad (3)$$

where $\sigma_p$ denotes the cross-sectional area of the NP and $r_{np}$ the radius of NP. Similarly, by analogy with electrostatics, the temperature rise for an ensemble of NPs that form an agglomerate with the radius of $R_{ag}$ is $$T = T_\infty + \frac{\rho_N R_{ag} C_{opt} q_i \sigma_p}{2\kappa} \quad (4)$$

where $\rho_N$ denotes the concentration of particles per volume. For plasmonic NPs, a comparison of the temperature rise calculated from the existing theories and the measured temperature rise from experiments generally does not show a good agreement between the theory and the experiments. The discrepancy suggests that the fundamental understanding of heat generation at this scale is still unresolved. The interfacial thermal resistance, the role of hot electrons, and the mechanism of heat transfer at this scale (ballistic or diffusive) are among the open questions.

Local heating can be utilized in the heating or phase-change of water to harvest solar energy. Efficient harvesting of solar energy for steam generation is a key factor for a broad range of applications, from large-scale power generation, absorption chillers, and desalination systems to compact applications such as water purification for drinking, sterilization, and hygiene systems in remote areas where the only abundant energy source is the sun. Current methods of generating steam using solar energy rely on a surface or cavity to absorb the solar radiation, and transferring heat to the bulk liquid directly or via an intermediate carrier fluid. These methods, however, require high optical concentration and suffer from high optical loss and surface heat loss, or require vacuum to reduce convective heat loss under moderate optical concentration. The steam generated is usually in thermal equilibrium with the bulk liquid. Nanofluids have been studied as volumetric absorbers, potentially minimizing the surface energy loss by uniform temperature in the fluid and enhanced thermal conductivity of the nanofluid. Local generation of steam in a cold bulk liquid can be achieved through high concentrations or illumination of nanofluids by electromagnetic waves with high power intensity. Recently, Neumann et al. in "Solar vapor generation enabled by nanoparticles," *ACSNano* 7, 42-9 (2012) and "Compact solar autoclave based on steam generation using broadband light-harvesting nanoparticles," *Proc. Natl. Acad. Sci. U.S.A.* 110, 11677-81(2013) succeeded in the generation of steam in bulk water with Au NPs with the power of $10^3$ kW/m (optical concentration, $C_{opt}$, of 1000). However, the solar-thermal conversion efficiency of the approach was still only 24%. High optical concentrations limit the utilization of these approaches in stand-alone compact solar systems. Furthermore, high optical concentrations add complexity and cost to the solar-thermal conversion system.

SUMMARY OF EMBODIMENTS

In accordance with one embodiment of the invention, a localized heating structure for use in solar systems includes a thermally insulating layer having interconnected pores, a density of less than about 3000 kg/m$^3$, and a hydrophilic surface, and an expanded carbon structure adjacent to the thermally insulating layer. The expanded carbon structure has a porosity of greater than about 80% and a hydrophilic surface. Methods of forming the localized heating structure are also provided.

In some embodiments, the thermally insulating layer may have a thermal conductivity of less than about 10 W/(mK). The thermally insulating layer may include carbon foam and/or an aerogel, such as a silica aerogel. The expanded carbon structure may be an expanded graphite layer. The thermally insulating layer may have a thickness of less than about 20 cm and/or the expanded carbon structure may have a thickness of less than about 10 cm. The pores of the thermally insulating layer may have an average diameter of about 300-600 μm. The localized heating structure may further include an aerogel layer adjacent to the expanded carbon structure so that the expanded carbon structure is between the aerogel layer and the thermally insulating layer. The aerogel layer may include a silica aerogel and the thermally insulating layer may also include a silica aerogel.

In accordance with another embodiment of the invention, a localized heating structure for use in solar systems includes a spectrally-selective solar absorber, configured to absorb incident solar radiation and to reflect at wavelengths longer than about 2 μm, with an underlying heat-spreading layer having a thermal conductivity equal to or greater than about 50 W/(mK), a thermally insulating layer, adjacent to the spectrally-selective solar absorber, having a thermal conductivity of less than about 0.1 W/(mK), one or more evaporation openings through the spectrally-selective solar absorber and through the thermally insulating layer, and an evaporation wick, disposed in one or more of the evaporation openings in the thermally insulating layer, configured to contact liquid and to allow the liquid to be transported from a location beneath the thermally insulating layer through to the spectrally-selective solar absorber in order to generate vapor from the liquid. The thermally insulating layer has a density less than the liquid so that the localized heating structure is able to float on the liquid.

In some embodiments, the spectrally-selective solar absorber may include a cermet layer coated on a metal substrate, such as a copper substrate or an aluminum foil.

The evaporation wick may include a cotton material. The thermally insulating layer may include a polymer material, such as a polystyrene foam, an polymer aerogel, and/or a polymer bubblewrap, or may include a silica aerogel. The one or more evaporation openings may include a plurality of evaporation openings distributed throughout the spectrally-selective solar absorber and the thermally insulating layer. One evaporation wick may be disposed in each of the evaporation openings. The localized heating structure may further include a convective cover adjacent to the spectrally-selective solar absorber so that the spectrally-selective solar absorber is between the convective cover and the thermally insulating layer. The convective cover may include a polymer layer, such as bubblewrap, or may include an aerogel. The localized heating structure may further include an evaporation layer in contact with the evaporation wick and disposed between the spectrally-selective solar absorber and the thermally insulating layer. The evaporation layer is configured to allow the liquid to be transported from the evaporation wick to the evaporation layer. The evaporation layer may include a cotton material or any other hydrophilic fabric. The localized heating structure may further include an anti-fouling coating adjacent to the thermally insulating layer so that the thermally insulating layer is between the spectrally-selective solar absorber and the anti-fouling coating. The localized heating structure may further include a suspension configured to hold the spectrally-selective solar absorber above the liquid so that the spectrally-selective solar absorber is not directly contacting the liquid.

In accordance with another embodiment of the invention, a localized heating structure for use in solar systems includes a spectrally-selective solar absorber, configured to absorb incident solar radiation and to reflect at wavelengths longer than about 2 μm, with an underlying heat-spreading layer having a thermal conductivity equal to or greater than about 50 W/(mK), a suspension configured to hold the spectrally-selective solar absorber above liquid so that the spectrally-selective solar absorber is not directly contacting the liquid, and one or more evaporation openings through the spectrally-selective solar absorber.

In some embodiments, the spectrally-selective solar absorber may include a cermet layer coated on a metal substrate, such as a copper substrate or an aluminum foil. The localized heating structure may further include a convective cover adjacent to the spectrally-selective solar absorber so that the convective cover covers an upper surface of the spectrally-selective solar absorber. The convective cover may include a polymer layer, such as bubblewrap, or may include an aerogel. The one or more evaporation openings may further include a plurality of evaporation openings distributed throughout the spectrally-selective solar absorber. The localized heating structure may further include a thermal emitter layer adjacent to the spectrally-selective solar absorber so that the thermal emitter layer covers a lower surface of the spectrally-selective solar absorber facing the liquid. The thermal emitter layer may have an infrared emittance of at least 60% in order to achieve non-contact radiative heating. The thermal emitter layer may include a carbon layer, a black paint, and/or a metal oxide layer. The bottom side of the absorber facing the water surface may be a blackbody (rather than a spectrally selective) emitter. In this embodiment, the air layer between the absorber and the water surface serves as the thermally insulating layer.

BRIEF DESCRIPTION OF THE DRAWINGS

The foregoing features of the invention will be more readily understood by reference to the following detailed description, taken with reference to the accompanying drawings, in which.

DESCRIPTION OF ILLUSTRATIVE EMBODIMENTS

Figure 1:
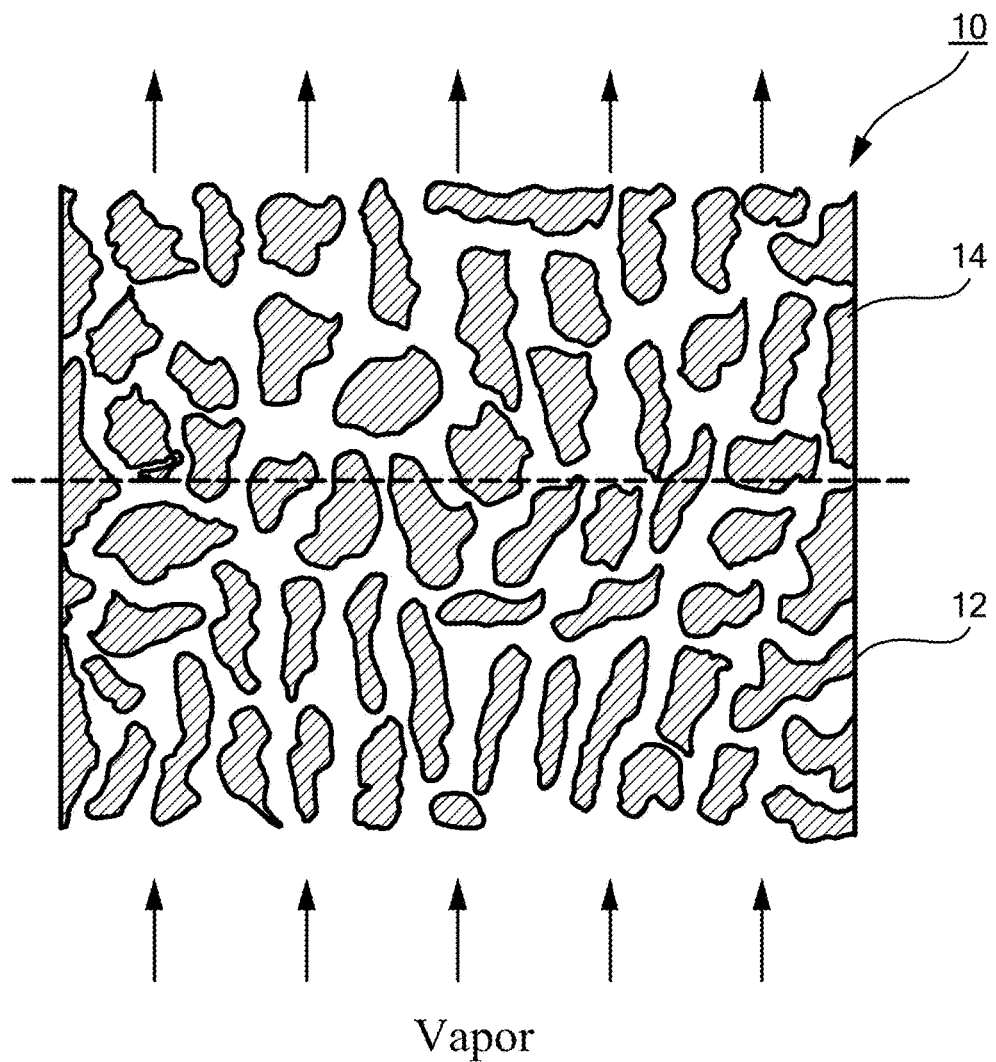
FIG. 1 schematically shows a localized heating structure according to embodiments of the present invention.

Various embodiments of the present invention provide structures that harvest solar energy efficiently in the form of heat. These structures concentrate the solar energy locally where it is needed and consequently minimize the dissipated thermal energy. The structures described herein aim to enhance the surface evaporation, to boost the efficiency of solar heating and to achieve local boiling at low $C_{opt}$ by minimizing heat dissipation to the surrounding medium.

As discussed in more detail below, one embodiment of a localized heating structure provides a layered structure which absorbs solar illumination and confines the thermal energy (formation of a hot spot) to near the structure's surface while efficiently wicking the fluid to this hot spot for enhanced evaporation flux. This embodiment of the localized heating structure yields a solar-thermal conversion efficiency of 85% at 10 kWm$^{-2}$ solar illumination, while generating steam in open air. One example of a localized heating structure of this embodiment includes a double layer structure (DLS). The DLS includes a thermally insulating, hydrophilic layer having a network of interconnected pores supporting a porous, hydrophilic, expanded carbon structure. The four main characteristics of the DLS include (1) high absorption in the solar spectrum, (2) low thermal conductivity to suppress thermal conduction away from the hot internal region, (3) hydrophilic surfaces (i.e., contact angle, θ, <90°) to leverage capillary forces and promote fluid flow to the hot region, and (4) interconnected pores for fluid flow to and from the structure. Localization of heat is achieved by the broad-spectrum absorbing and thermally insulating properties of the heating structure while the fluid flow is channeled to the hot spot by its hydrophilic and porous nature. The enhancement in the fluid evaporation rate through the heating structure is an increasing function of the solar concentration and for incident power equivalent to one sun (1000 W/m$^2$), this enhancement is 1.9 times that of water without the heating structure. The thermal efficiency of this structure is 71% and 80% for solar power 1000 W/m$^2$ and 2000 W/m$^2$, respectively.

In another embodiment, a heating structure localizes the solar energy internally for solar heating. The heating structure includes a porous, expanded carbon structure sandwiched between two thermally insulating layers, such as aerogel layers, e.g., silica aerogel layers. A hot region is induced in the expanded carbon structure and the low surface temperature of the top thermally insulating layer minimizes the energy dissipation by convection and radiation. The thermal efficiency of this system can reach close to 100% by proper design of the thermally insulating layers.

In another embodiment, a hydrophobic, volumetric absorbing structure promotes the nucleation of a vapor phase throughout the liquid volume, which significantly enhances the rate of boiling. With this volumetric absorber structure, the threshold concentration of solar energy required for local phase-change is reduced drastically compared to previous structures. The mechanism of local phase-change may be extended to other micro- and nanoparticles (NPs) and other base fluids.

In another embodiment of a localized heating structure, a layered structure absorbs solar illumination and confines the thermal energy to near the structure's surface while efficiently wicking the fluid to the structure using an evaporation wick for enhanced evaporation flux. One example of a localized heating structure of this embodiment includes a thermally insulating layer supporting a spectrally-selective solar absorber. The localized heating structure also includes one or more openings through the spectrally-selective solar absorber and through the thermally insulating layer and the evaporation wick disposed in one or more of the openings in the thermally insulating layer that channels the fluid flow through the localized heating structure. Details of illustrative embodiments are discussed below. Although the discussion below describes structures for the heating and phase change of water, other liquids may also be used.

Figure 2:
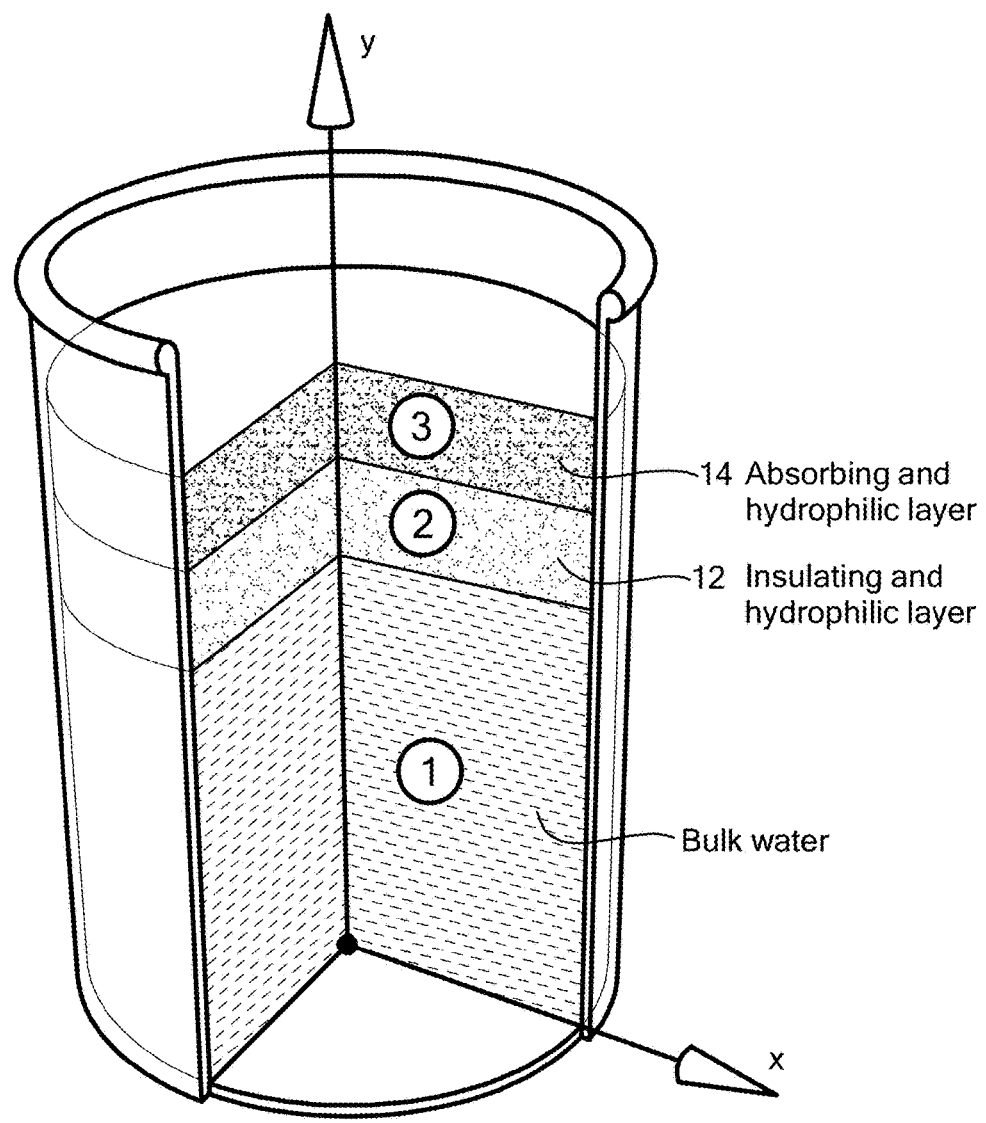
FIG. 2 schematically shows a localized heating structure in a container with water according to embodiments of the present invention in a container with water.
Figure 3A:
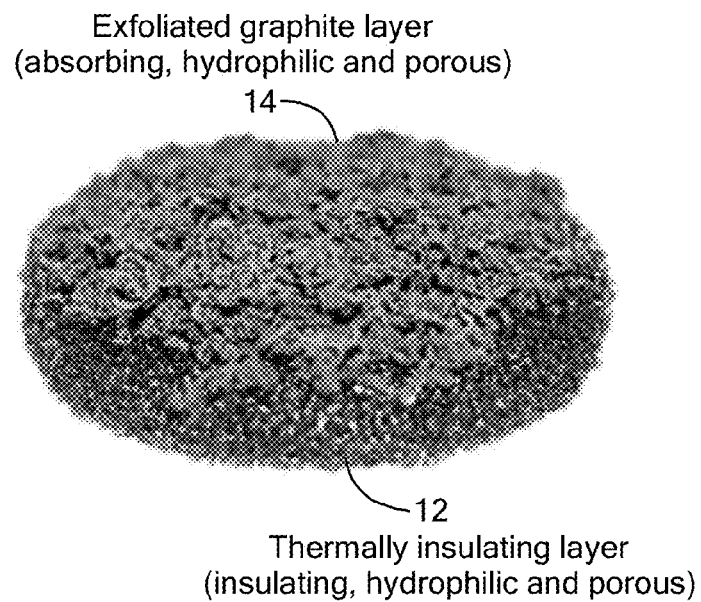
FIGS. 3A and 3B show a perspective view and cross-sectional view, respectively, of a localized heating structure with an expanded graphite layer according to embodiments of the present invention.
Figure 3B:
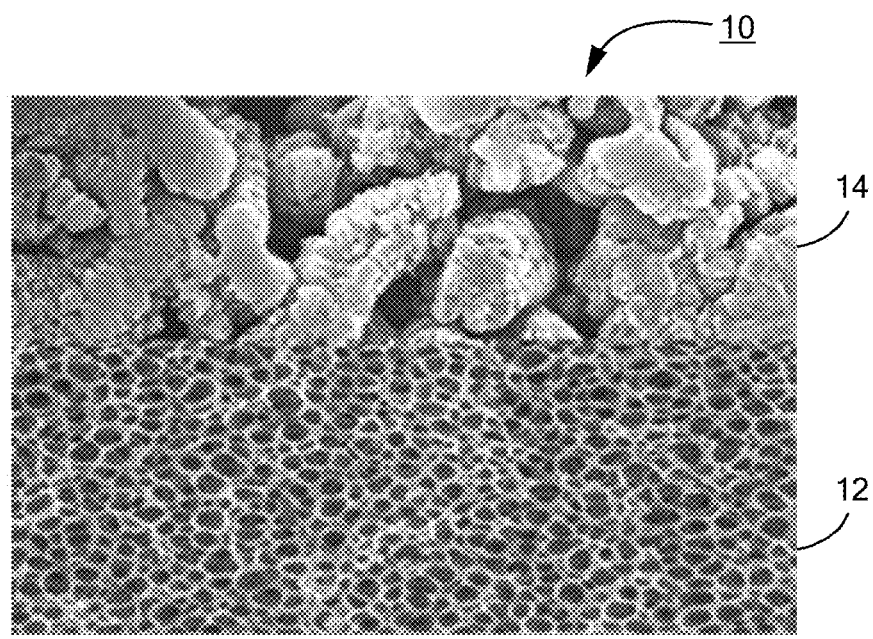

FIG. 1 schematically shows a localized heating structure 10 according to embodiments of the present invention, and FIG. 2 shows an exemplary heating structure in a container with water. The heating structure 10 includes a bottom layer having a thermally insulating, hydrophilic layer 12 with a network of interconnected pores and a top layer having a porous, hydrophilic, expanded carbon structure 14. Preferably, the thermally insulating layer 12 has a thermal conductivity of less than about 10 W/(mK). As shown in FIG. 3B, the thermally insulating bottom layer 12 is configured with smaller pore sizes than the top layer 14 in order to promote liquid supply and the expanded carbon structure top layer 14 is configured with larger pore sizes than the bottom layer 12 in order to promote vapor escape. Preferably, the density of the thermally insulating layer 12 is less than about 3000 kg/m$^3$ and the pores of the thermally insulating layer 12 have an average diameter of about 300-600 μm. The expanded carbon structure 14 preferably has a porosity of greater than about 80%.

The low surface temperature of the heating structure 10 minimizes losses due to thermal convection and radiation to the environment. For a constant heat generation, the steady state solution of a diffusive heat equation with boundaries at $T_\infty$ provides the maximum temperature at the center of the slab $$T = T_\infty + \frac{C_{opt} q_i h}{4\kappa}. \quad (5)$$

Where h denotes the thickness of slab. At low values of $C_{opt}$, by proper selection of the medium, the value of κ can be tuned to achieve a hot spot in the center of slab. For example, for a slab with thickness of 1 cm under solar illumination with no optical concentration $C_{opt}=1$ and the thermal conductivity of 0.03 W/(mK), the temperature rise can reach to 83° C.

The porous structure and hydrophilic surface of the localized heating structure 10 promotes the flow of water to the surface due to capillary force. For a pore with diameter of α, the capillary rise ($h_t$) is given by $$h_t = \frac{2\gamma \cos\theta}{\alpha \rho g} \quad (6)$$

where γ denotes the liquid-vapor surface tension, θ the contact angle, ρ the density of fluid, and g gravitational acceleration. For a hydrophilic surface (θ<90), $h_t$ is positive and for a hydrophobic surface (θ>90), $h_t$ is negative. To leverage the capillary force in the surface evaporation, the surfaces of both layers of the heating structure 10 are made hydrophilic. The capillary force in the expanded carbon layer 14 enhances the evaporation rate of fluid through a few mechanisms, e.g., formation of thin films on the surface of graphite sheets, enhanced roughness of the surface, and formation of three-phase contact lines at the edges of the capillaries.

As shown in FIG. 2, the localized heating structure 10 is a floating structure that includes two or more layers of which the bottom layer is a porous, thermally insulating layer 12, such as carbon foam or an aerogel, and the top layer is the porous, expanded carbon structure 14, such as expanded graphite. The bottom layer 12 helps to further suppress the thermal conduction from the hot region in the top layer 14 to the bulk underlying water. The combination of these two layers concentrates the incident solar power locally near the surface of the liquid where the thermal energy for evaporation is needed. As shown with the arrows in FIG. 1, during the evaporation process, the fluid wicks into the pores in the thermally insulating layer 12, then into the hot spot in the expanded carbon structure 14, evaporates and forms vapor, which leaves the heated structure 10 from the top surface of the expanded carbon structure 14. Preferably, the thickness of the thermally insulating layer 12 may be less than about 20 cm, and the thickness of the expanded carbon structure 14 may be less than about 10 cm, and preferably about 5 to about 8 mm, although other thicknesses may also be used depending on the materials and desired application. The top layer 14 may also be made to be magnetic, which facilitates its collection after use, through the addition of iron during the fabrication procedure, as described in more detail below.

The reflectivity of the expanded carbon structure 14 is preferably less than about 10% in the solar spectrum (250-2250 nm). Thus, 90% or more of the irradiated solar power is absorbed within the top layer 14. Absorption in the top layer 14 induces the hot spot or region in the top layer 14 of the heating structure 10 where evaporation occurs. The thermal energy concentrated in this region can be transferred through several modes, e.g., liquid-vapor phase change, convection to the air, and conduction to the bottom underlying water. The last two modes of heat loss (convection and dissipation to the deeper water) should be minimized to boost the thermal efficiency of the evaporation process. Convection is strongly affected by the surface temperature of the heating structure. With the solar illumination of one sun, assuming h of 10 W/(m$^2$K), this mode dissipates approximately 10% of the incident solar power to the environment. The porous, thermally insulating bottom layer 12 of the heating structure 10 minimizes conduction to the water. Thus, embodiments of the heating structure 10 enhance the evaporation rate while keeping the underlying water temperature low by channeling the heat and fluid to where they are needed. For example, when the thermally insulating bottom layer 12 is formed from a carbon foam, the foam structure itself has a thermal conductivity of 0.03-0.05 (W/(mK)) in air. Once it is immersed in the water, the thermal conductivity of the bottom layer is determined by the effective medium theory because water within the foam also conducts heat.

Therefore, the thermally insulating layer 12 is preferably chosen so that it has a low thermal conductivity even when soaked in water or the liquid to be evaporated. The thermally insulating layer 12 is important for localizing thermal energy within the top layer 14. Preferably, the thermally insulating layer 12 includes both open and closed pores. The closed pores have several advantages, e.g., floating the structure, lowering the thermal conductivity, and limiting the fluid flow to the surface. Low thermal conductivity and limited fluid flow lead to the formation of the hot spot and generation of steam in the top layer 14 at low optical concentrations. The open pores provide paths for fluid to flow to the surface.

The top expanded carbon structure 14 may be formed from a low thermally conductive expanded graphite layer which absorbs solar irradiation volumetrically. For example, the expanded graphite layer may be formed from acid-washed graphite flakes (commercially available from Anthracite Industries Inc.). In one embodiment, the acid-washed graphite flakes may be mixed with iron (II) acetate anhydrous, 97% (commercially available from Strem Chemicals) with a ratio of 60-40 wt %. The mixture or flakes are heated in a microwave for about 7 seconds to form an exfoliated, expanded fluffy structure. The trapped gases between the graphite layers expand in the synthesis process and detach the flakes from each other. The volumetric exfoliation during this process is approximately 100 times. The surface area of the exfoliated graphite layer is approximately 320 m$^2$g$^{-1}$, 32 times higher than unprocessed graphite flakes, which allows for more efficient heat transfer to the fluid. The dispersed iron species formed after the decomposition of iron (II) acetate provides a ferromagnetic structure. The ferromagnetism of the exfoliated graphite helps its collection after use. The acid-washed graphite flakes originally have a hydrophobic surface. However, in the exfoliation process, due to high temperature, the graphite surface is oxidized and turns into a hydrophilic surface. Other candidates for the porous, hydrophilic carbon structure 14 may include amorphous carbon foams and carbon nanotube (CNT) sponges.

The bottom thermally insulating layer 12 may be formed from carbon foam, e.g., Duocel carbon foam of type PPI 80 (80 pores per inch) (commercially available from K. R. Reynolds). In one embodiment, the carbon foam is washed in 4% molar nitric acid for 2 hrs while stirring to make its surface hydrophilic. FIGS. 3A and 3B show a perspective view and cross-sectional view, respectively, of a localized heating structure 10 with a top layer formed 14 from an expanded graphite layer and a bottom layer 12 formed from carbon foam. FIG. 3A is shown with a 5× magnification, and FIG. 3B is shown with a 43× magnification. A more detailed description of the dual layer structure and its testing parameters are described in Ghasemi et al., "Solar steam generation by heat localization," *Nature Communications*, 5:4449 (2014), incorporated by reference herein in its entirety.

Alternatively, or in addition, the thermally insulating layer 12 may be formed from an aerogel. Aerogel synthesis is well known and established processing steps can be used to synthesize the thermally insulating layer 12. For example, a procedure for synthesizing wet silica gels by the sol-gel polymerization of tetramethyl orthosilicate (TMOS) may be used. Because hydrolysis of TMOS is much faster than that of tetraethyl orthosilicate (TEOS), NH$_3$ is used as a condensation catalyst rather than HCl as a hydrolysis catalyst. TMOS is diluted by methanol (MeOH) followed by adding NH$_3$ and water. One possible mixing mole ratio of chemicals is NH$_3$:TMOS:water:methanol=0.07:1:4:6. Then, the sol may be gelled in a disposal vial. For example, the sol may be gelled in a disposal vial for about one week, and then the lid of the sol-gel mold may be removed. By varying the pH during the aerogel synthesis process, and/or the drying time during the drying process, the pore size of the aerogel can be controlled. Although silica aerogels are naturally strongly absorbing from 5-30 μm, absorption from 3-5 μm can be further increased through the addition of water or other dopants (e.g., carbon-based dopants) into the aerogel. The thermal conductivity of aerogels also depends strongly on its structures, which should be optimized in conjunction with its optical properties.

Embodiments of the heating structure 10 provide the maximum $\eta_{th}$, which is 68% at 1000 W/m$^2$ The efficiency achieved under 1× concentration of solar illumination is about 11% higher than the maximum values previously reported. Thus, the heating structure 10 of the present invention provides a significant step forward in enhancing the efficiency of the phase-change process in solar systems and other heating systems.

Figure 4:
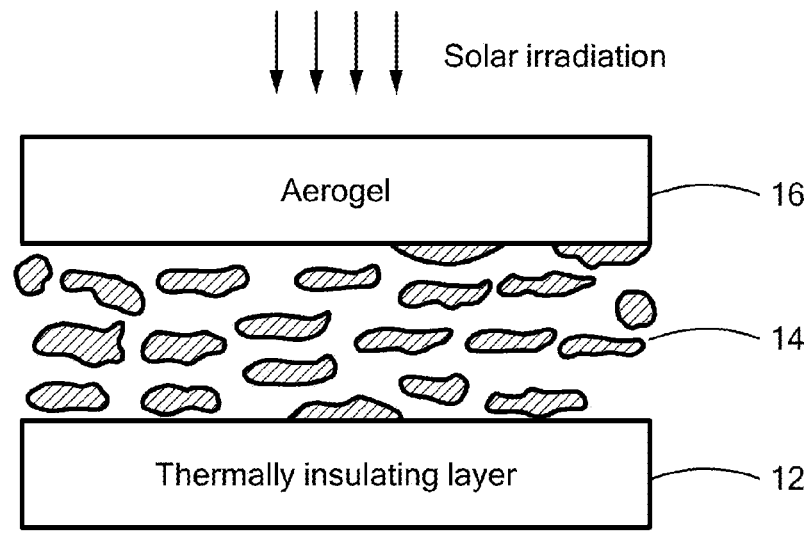
FIG. 4 schematically shows a localized heating structure having an aerogel layer according to embodiments of the present invention.

The localized heating structure 10 may also include one or more additional layers on either side of or between the bottom and top layers 12, 14. For example, as shown in FIG. 4, the heating structure 10 may include an aerogel layer 16 adjacent to the top layer 14, so that the expanded carbon structure 14 is sandwiched between the aerogel layer 16 and the thermally insulating layer 12. This configuration of the localized heating structure 10 concentrates the solar energy in a specific flow region for solar heating and minimizes the dissipated thermal energy. The aerogel layer 16 is transparent in the visible spectrum but opaque in the infrared region. Preferably, the aerogel layer 16 is formed from a silica aerogel. The thermal conductivity of silica aerogel is 0.02±0.003 W/(mK). This low value of thermal conductivity allows for localization of thermal energy in the expanded carbon structure 14. In solar heating systems, the working fluid flows through the expanded carbon structure 14 to absorb the thermal energy. Since the surface temperature of the top aerogel layer 16 is low, the energy dissipation by the convection and radiation is minimized. The thermal efficiency of this heating structure 10 can reach close to 100% by proper design of the aerogel layer 16 and the bottom layer 12. Furthermore, embodiments having this configuration are economically a better choice than nanofluids based solar collectors. Preferably, the top aerogel layer 16 is transparent to solar radiation, but the transparency of the bottom layer 12, when formed with an aerogel layer, is not necessary.

Embodiments of the localized heating structure 10 may be formed with various materials and layers, but should include a porous layer 14 for absorbing the solar radiation and an insulating layer 12 between the liquid to be evaporated and the porous layer 14. The porous, absorbing layer 14 allows water or other liquids to be evaporated to be supplied to this region and vapor to escape from this region. The porous, absorbing layer 14 could be designed with low thermal conductivity such that heat does not leak out. The thermal insulation layer 12 helps to prevent the solar radiation absorbed by the porous, absorbing layer 14 from being lost to the environment by convection and by thermal radiation. For example, other layers may be incorporated below the porous, absorbing layer 14, to better supply water to this layer 14 and/or to provide a path for the generated steam to leave the layer 14. Other structures especially designed for the vapor passage can be incorporated into the heating structure 10. In addition, both layers 12, 14 are described as having hydrophilic surfaces (i.e., contact angle, θ, <90°), but a combination of hydrophilic and hydrophobic surfaces may also be used. For example, a composite with mixed hydrophilic and hydrophobic regions may be used to better control the liquid supply rate. In addition, the porous absorbing layer 14 can also be designed to have different porosities, smaller pores for liquid supply and larger pores for vapor escape.

Figure 5:
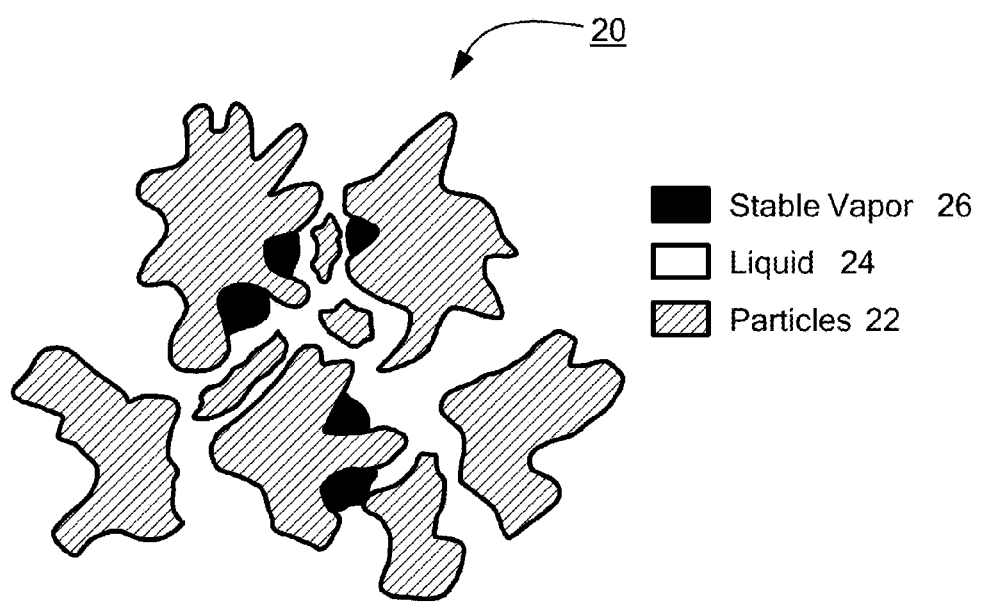
FIG. 5 schematically shows a volumetric absorber according to embodiments of the present invention.

For applications that require heating throughout the entire fluid volume, another embodiment of a heating structure is provided that locally absorbs and concentrates the electromagnetic illumination. As shown in FIG. 5, a volumetric absorber 20 is formed from NPs 22 in an aqueous suspension 24. The volumetric absorber 20 can form a homogeneous spherical agglomerate with the radius of $R_{ag}$. In this case, the steady state solution of the heat equation provides the maximum temperature at the center of the agglomerate of $$T = T_\infty + \frac{3C_{opt}q_i R_{ag}}{24\kappa}. \tag{7}$$

For low optical concentration, $C_{opt}$, and in an aqueous solution, the expected temperature rise, T, is much smaller than the temperature required for vapor-phase nucleation. For low values of $C_{opt}$, the temperature rise on the NPs 22 in contact with water is small. Thus, local boiling on the surface of NPs 22 requires concentration close to $C_{opt}=100$.

The developed system consists of an aqueous solution 24 of NPs 22 that have hydrophobic surfaces.

In one embodiment, a hydrophobic carbon is used, e.g., carbon black (CB) particles. For example, a nanofluid composed of these particles and water are prepared with carbon concentration of 1 wt %. The nanofluid is sonicated for 5 min to make a homogenous solution. The particles precipitate after few minutes; however, the nanofluid will undergo buoyancy-driven convection once it is exposed to a threshold concentration of solar irradiation and again becomes homogeneous. The transmittance of this fluid is less than 0.01% suggesting that the most of solar power is absorbed by the particles.

In an aqueous solution, if two hydrophobic surfaces are brought close together, the liquid water is not a stable phase between them and the liquid transforms to the vapor phase 26. Although the formation of vapor phase is thermodynamically feasible, a kinetic barrier may limit the formation of vapor phase to only few nanometer gap between the hydrophobic surfaces.

A stability analysis is performed to demonstrate the formation of a vapor phase once two hydrophobic surfaces come close to each other. The thermodynamic potential of the system is written as $$\Delta B = -\Delta U_C - T^R \Delta S_C + P^R \Delta V_C - \sum_i \mu_i^R \Delta N_{ic} \tag{8}$$

where U denotes the internal energy, T temperature, P pressure, S entropy, V volume, μ the chemical potential, N the number of moles, subscript C the composite system, superscript R the reservoir (in this case, the liquid phase) and subscript i the components in the system.

Consider the thermodynamic potential for the V-shape pore. The reference state (state 0) is when the V-shape pore is completely filled with water. If the thermodynamic potential of the vapor state (B) is less than the value of the fully wetted state ($B_0$) (e.g., if $B-B_0<0$), there exists the possibility for the formation of a stable vapor phase. Thus, we evaluate $$B-B_0=(P^L-P^V)V^V+(\gamma^{LV}\cos\theta)A^{SV}+\gamma^{LV}A^{LV} \tag{9}$$

where $\gamma^{LV}$ denotes the surface tension of liquid-vapor phase, A the surface area, superscript V vapor phase, superscript L liquid phase, superscript LV the liquid-vapor phase, superscript SV the solid-vapor phase. Since the radius of the liquid-vapor interface (α) is much smaller than the capillary length of water (2.6 mm), the liquid-vapor interface is assumed to be spherical. Thus, $$\beta = \theta + \alpha - \frac{\pi}{2} \tag{10}$$

$$l = \frac{a(1-\cos\beta)}{\sin\beta} \tag{11}$$

$$V^V = \frac{1}{3}\pi a^2 H - \frac{\pi l}{6}(3a^2+l^2) \tag{12}$$

$$A^{LV} = \pi(a^2+l^2) \tag{13}$$

$$A^{SV} = \frac{a\pi H}{\cos\alpha}, \text{ and} \tag{14}$$

$$H = \frac{a}{\tan\alpha}. \quad (15)$$

Assuming the Young-Laplace equation is valid at the liquid-vapor interface of these nano-scale pores, the pressure drop across the liquid-vapor interface is $$P^L - P^V = \frac{2\gamma^{LV}\sin\beta}{a}. \quad (16)$$

Combining eqs. (10)-(16), and eq. (9) for a given contact angle of the fluid on the solid surface (θ), the difference in thermodynamic potential, $B-B_0$, is determined as a function of the angle of V-shape pore (2α). This suggests that for small contact angle the vapor phase is a stable phase in a V-shape pore. For an agglomerate of particles, these vapor phases could be interconnected. This interconnection of the vapor phase drops the thermal conductivity of medium surrounding the light-absorbing particle from the relatively high liquid value of ~0.6 W m$^{-1}$ K$^{-1}$ to that of the vapor phase (~0.02 W m$^{-1}$ K$^{-1}$), which is a 30× reduction in the value of κ.

The rough surface on these particles provides the correct condition for the formation a stable vapor phase. The density of CB particles ($\rho_{CB}$) is ~2000 kg/m$^3$ and their radius ($r_p$) is ~100 nm. Given this and assuming the thermal conductivity of vapor phase surrounding the particles, for $C_{opt}$=6, if the size of agglomerates is more than 120 μm, then the temperature of vapor phase exceeds the saturation temperature and stable vapor bubbles form.

Preferably, the size of the agglomerates ranges form 100-600 μm. The vapor temperature reaches 100° C. after a several minutes, while the liquid temperature is still close to 80° C. $C_{opt}$=5.5 is the lowest concentration to generate steam with the temperature of 100° C. Using this structure, steam is generated with 200 times lower concentration than previous structures. This drastic drop in the threshold $C_{opt}$ is attributed to the existence of the stable vapor phase in the hydrophobic surface of agglomerate of CB particles. As the thermal conductivity of vapor phase is 30 times less than that of liquid water, the threshold $C_{opt}$ drops significantly.

The bubble grows once it is supplied enough energy for the phase transformation. As the bubble grows, the temperature inside the vapor bubble is a function of the density of particles, $\rho_N$. We assume $\rho_N$ remains constant as the droplet grows. The supplied energy to the bubble contributes to both phase change at the liquid-vapor interface and thermal conduction to the liquid phase. If the vapor phase is assumed to be an ideal gas, for a vapor bubble with the radius of ($R_{ag}$+r), combining the energy balance and the Young-Laplace equation at the liquid-vapor interface gives $$\dot{q} = \dot{r}\left(\frac{h_{LV}}{RT^V}\right)\left(-\frac{8}{3}\gamma\pi*\left(r - \frac{R_{ag}^3}{r^2}\right) + 4\pi r(P^L r + 2\gamma)\right) + \kappa^L(4\pi r^2)(T^s - T_\infty) \quad (17)$$

where $\dot{q}$ is equal $q_i(\pi R_{ag}^2)$ and R denotes the gas constant. For a given solar irradiation, $\dot{q}$, one can rewrite the equation in terms of the bubble growth rate, $\dot{r}$, and solve the differential equation for r=r(t). The initial condition of this ordinary differential equation is r(0)=$R_{ag}$. The bubble grows to 500 μm in around 160 seconds.

In conclusion, embodiments significantly enhance the temperature rise on the surface of NPs and achieve local boiling at much lower solar concentrations than reported before. This approach provides the ability to tune the thermal conductivity of the surrounding medium around the NPs. In one embodiment, carbon black particles in a water solution were used. The hydrophobic surfaces of these particles promote the formation of vapor phase around these particles. Since the thermal conductivity of water vapor is 30 times less than that of liquid water, the temperature rise over these particles under the electromagnetic illumination is much higher than the NPs in contact with liquid water. Thus, local temperature for phase-change process is achieved at lower solar concentrations. Embodiments of the present invention can be extended to other absorbing and plasmonic NPs. By tuning the surface characteristics of these particles, the temperature rise over these particles can be adjusted.

Although the above discussion emphasizes hydrophobic surfaces, it is understood that the important characteristics of embodiments of the invention include clusters of micron-sized or nano-sized particles clustered together in the liquids, the clusters should strongly absorb solar radiation, and the clusters should form to create thermodynamically stable nucleation sites. Although hydrophobic materials can form such stable nucleation sites, it is understood that such sites could be also formed by using composites particles, or particles with some regions hydrophilic and other regions hydrophobic, or particles with adjusted hydrophilicity.

Figure 6A:
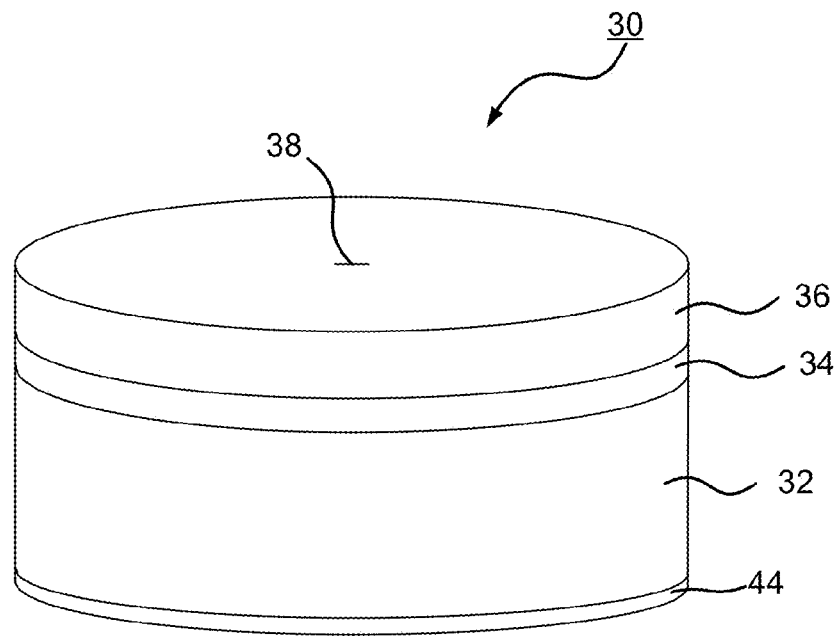
FIGS. 6A and 6B schematically show a perspective view and cross-sectional view, respectively, of another localized heating structure according to embodiments of the present invention.
Figure 6B:
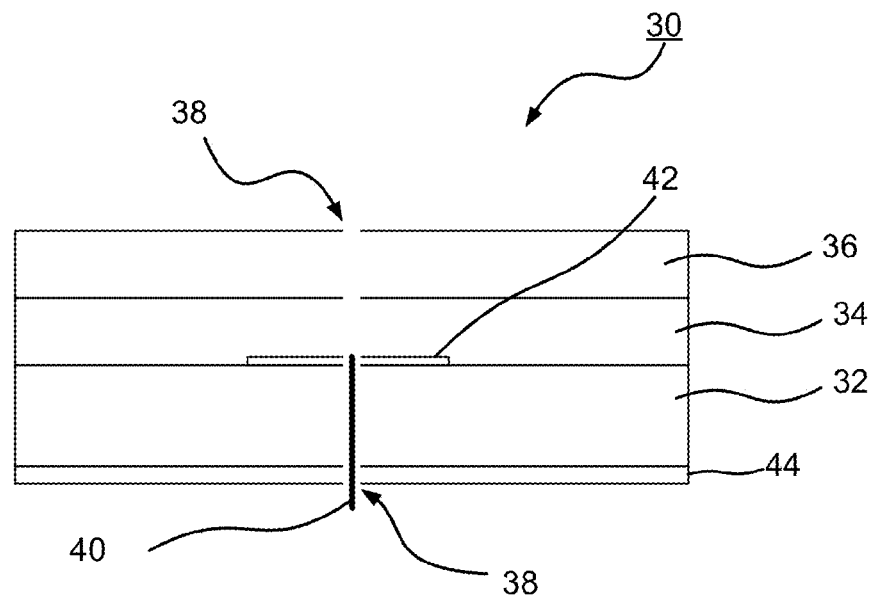

FIGS. 6A and 6B schematically show a localized heating structure 30 according to embodiments of the present invention. The heating structure 30 includes a bottom layer having a thermally insulating layer 32 with a thermal conductivity of less than about 0.1 W/(mK) and a top layer having a spectrally-selective solar absorber 34 configured to absorb incident solar radiation and to reflect at wavelengths longer than about 2 μm. The spectrally-selective solar absorber 34 preferably has a thermal conductivity equal to or greater than about 50 W/(mK). The localized heating structure 30 is a floating structure that is configured to have the thermally insulating layer 32 directly contact the liquid underneath the structure or configured to have the spectrally-selective solar absorber 34 suspended up from the liquid, as discussed in more detail below with regard to FIG. 7. When the thermally insulating layer 32 directly contacts the liquid, the thermally insulating layer 32 has a density less than the liquid so that the heating structure 30 is able to float on the liquid. For example, the thermally insulating layer 32 may have a density of less than about 1000 kg/m$^3$. In addition to floating the entire heating structure 30, the thermally insulating layer 32 insulates the hot spectrally-selective solar absorber 34 from the cool underlying water or liquid, reducing the conductive and radiative heat losses to the liquid underneath, and permits the liquid to be transported to the spectrally-selective solar absorber 34 as discussed in more detail below.

The heating structure 30 further includes one or more evaporation openings 38 through the spectrally-selective solar absorber 34 and through the thermally insulating layer 32. The evaporation openings 38 allow water vapor to escape from the spectrally-selective solar absorber 34 and allow water to be delivered to the spectrally-selective solar absorber 34 from the liquid underneath the thermally insulating layer 32. An evaporation wick 40 is disposed in one or more of the evaporation openings in the thermally insulating layer 32. The evaporation wick 40 contacts the liquid underneath and allows the liquid to be transported from a location beneath the thermally insulating layer 32 through to the spectrally-selective solar absorber 34 so that the spectrally-selective solar absorber 34 heats up the liquid and generates vapor from the liquid.

As mentioned above, the thermally insulating layer 32 helps to suppress the thermal conduction from the hot region in the spectrally-selective solar absorber 34 to the bulk underlying liquid. The combination of these two layers concentrates the incident solar power locally near the surface of the liquid where the thermal energy for evaporation is needed. During the evaporation process, the fluid wicks into and/or onto the evaporation wick 40 and travels through the one or more evaporation openings 38 in the thermally insulating layer 32, then into the hot spot in the spectrally-selective solar absorber 34. The fluid evaporates and forms vapor, which then leaves the heating structure 30 through the one or more evaporation openings 38 in the spectrally-selective solar absorber 34.

Embodiments of the localized heating structure 30 may be formed with various materials and layers. The spectrally-selective solar absorber 34 provides both high solar absorptance (e.g., $\alpha=0.93$) and low thermal emittance (e.g., $\epsilon=0.07$) at 100° C. The spectrally-selective solar absorber 34, which strongly absorbs sunlight, but emits very little radiative heat, may be formed, e.g., from a cermet layer (e.g., BlueTec eta plus) coated on a highly thermally-conductive substrate to spread heat along the surface of the absorber. The conductive substrate can be made of metal, such as a copper film or an aluminum foil or a carbon material (e.g., carbon black). The thermal conductivity of this heat-spreading substrate may be greater than 50 W/(mK). The thermally insulating layer 32 may be formed from a polymer foam, e.g., polystyrene foam (k=~0.03 W/m-K), or an aerogel, as discussed above with regard to FIGS. 1-4. The thickness of the thermally insulating layer 32 may be greater than 1 mm and less than 1 m and the thickness of the spectrally-selective solar absorber 34 may be 10 μm to 10 mm based on the material used. For example, the thickness of the thermally insulating layer 32 for a polystyrene foam may be about 1 cm to about 10 cm, e.g., 3 cm, and the thickness of the spectrally-selective solar absorber 34 for a cermet (e.g., BlueTec eta plus) coating on a copper substrate may be 10 μm to 100 nm for the coating and 10 μm to 1 mm for the copper substrate, although other thicknesses may also be used depending on the materials and desired application.

Figure 11B:
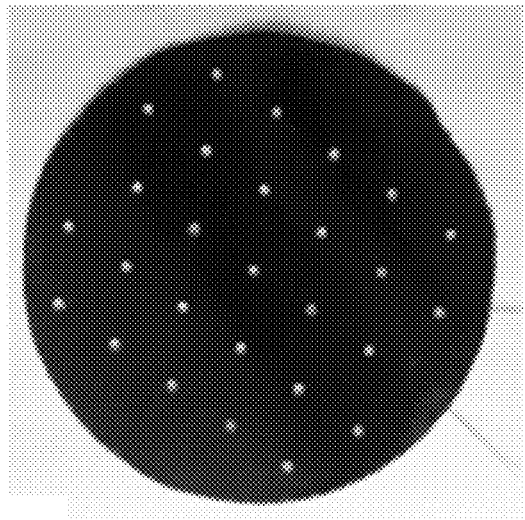
FIG. 11B shows a perspective view of the localized heating structure measured in FIG. 11A.

The one or more evaporation openings 38 through the spectrally-selective solar absorber 34 and through the thermally insulating layer 32 may include one opening 38 through the spectrally-selective solar absorber 34, through the heat-spreading layer, and through the thermally insulating layer 32, as shown in FIGS. 6A and 6B, or may include a plurality of openings 38 distributed throughout the spectrally-selective solar absorber 34 (such as shown in FIG. 11B), through the heat-spreading layer, and/or distributed throughout the thermally insulating layer 32. The one or more evaporation openings 38 may have an appropriate size and shape depending on the size of the heating structure 30. For example, the evaporation openings 38 may be slots formed in the spectrally-selective solar absorber 34 that are 1 mm wide with varying lengths, and may be separated by other openings with about 5-10 mm separation distance. The evaporation openings 38 may be circular openings, e.g., about 2 mm or smaller circular openings, that are distributed throughout the spectrally-selective solar absorber 34.

The evaporation wick 40 may be formed from a material that is configured to wick the liquid up into the heating structure 30. For example, the evaporation wick 40 may be formed from a cotton material that uses capillary forces to deliver water or fluid to the spectrally-selective solar absorber 34. The evaporation wick 40 may have various shapes, such as flared at one or both ends, to promote the transport of the liquid into the heating structure 30. The evaporation wick 40 may be removably coupled to the thermally insulating layer 32 and/or the spectrally-selective solar absorber 34, so that the evaporation wick 40 may be easily replaced, e.g., if contaminants from the liquid degrade the effectiveness of the wicking action of the evaporation wick 40 over time.

The localized heating structure 30 may also include one or more additional layers on either side of or between the thermally insulating layer 32 and the spectrally-selective solar absorber 34. For example, the heating structure 30 may optionally include a convective cover 36 above the spectrally-selective solar absorber 34 (from the perspective of the incident solar irradiation) that reduces convective heat loss to the air above and has high optical transparency to sunlight. For example, the convective cover 36 may be a polymer film, such as bubblewrap, and the bubblewrap may be placed above the spectrally-selective solar absorber 34 with the bubbles facing down. Polymer films currently sold in the agricultural industry for use in greenhouses offer high optical transparency and durability that may be suitable for use in the heating structure 30. One or more evaporation openings 38 may be formed in the convective cover 36 to allow vapor to escape the heating structure 30.

The heating structure 30 may optionally include an evaporation layer 42, placed between the spectrally-selective solar absorber 34 on the heat-spreading substrate and the thermally insulating layer 32, that increases the evaporative area. The evaporation layer 42 may be in contact with the evaporation wick 40 and placed on the thermally insulating layer 32. For example, a sheet of cotton fabric may be placed in contact with the evaporation wick 40 on the thermally insulating layer 32. The evaporation layer 42 may be any suitable shape, e.g., shaped as squares (as shown in FIG. 9C) or circles (as shown in FIG. 10B) with diameters from 4 mm to 24 mm.

The heating structure 30 may optionally include an anti-fouling coating 44, on the underside of the thermally insulating layer 32, which serves as an anti-fouling or anti-scaling layer that prevents contaminants in the liquid, e.g., salt, from depositing onto the thermally insulating layer 32 and degrading performance of the heating structure 30 over time.

A more detailed description of the spectrally-selective solar absorber 34 and thermally insulating layer 32 and its testing parameters are described in Ni et al., "Steam Generation under One Sun Enabled by a Floating Structure with Thermal Concentration," Nature Energy, article no. 16126 (2016), incorporated by reference herein in its entirety.

Figure 7:
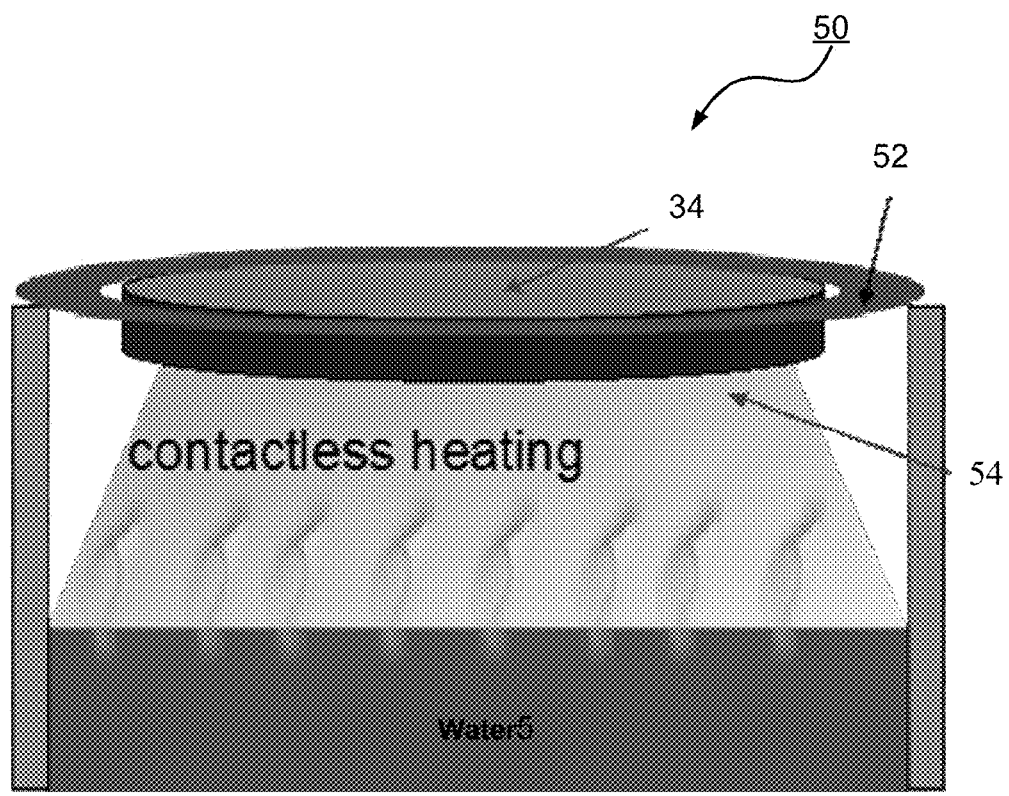
FIG. 7 schematically shows another localized heating structure according to embodiments of the present invention.

FIG. 7 schematically shows a contactless localized heating structure 50 that is configured to suspend the spectrally-selective solar absorber 34 with its heat-spreading layer up above the liquid with a suspension 52. In one embodiment, the heating structure 50 may include a thinned thermally insulating layer 32 (not shown) or the thermally insulating layer 32 may be eliminated altogether to maximize the backside temperature. In one embodiment, a thermal emitter layer 54 may be adjacent to the spectrally-selective solar absorber 34 on its lower surface between the spectrally-selective solar absorber 34 and the liquid below. The thermal emitter layer 54 preferably has an infrared emittance of at least 60% in order to achieve non-contact radiative heating of the liquid below. In this configuration, the liquid is heated by thermal radiation from the bottom surface of the thermal emitter layer 54, and the air layer plays the role of the thermally insulating layer 32. The thermal emitter layer 54 may be formed of a carbon layer, a black paint, and/or a metal oxide layer. In another embodiment, the heating structure 30, discussed above with regard to FIGS. 6A and 6B, may be suspended above the liquid using the suspension 52.

EXAMPLES

Experiments were conducted to prove the viability of the localized heating structure according to embodiments of the present invention.

Example 1

Figure 8A:
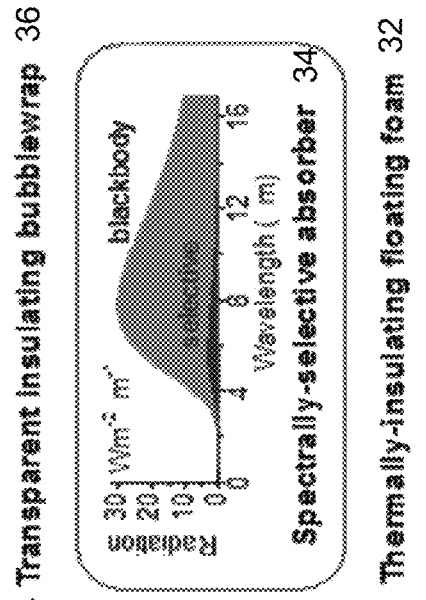
FIGS. 8A and 8B schematically show energy balance and heat transfer diagrams for an ideal body and a localized heating structure according to embodiments of the present invention, respectively.
Figure 8B:
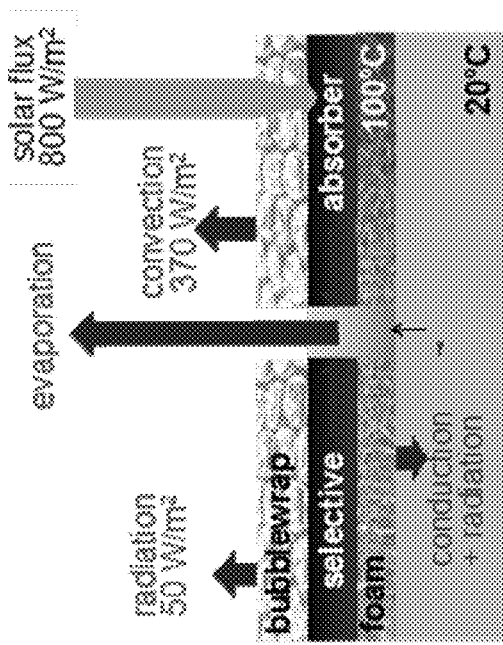
Figure 8C:
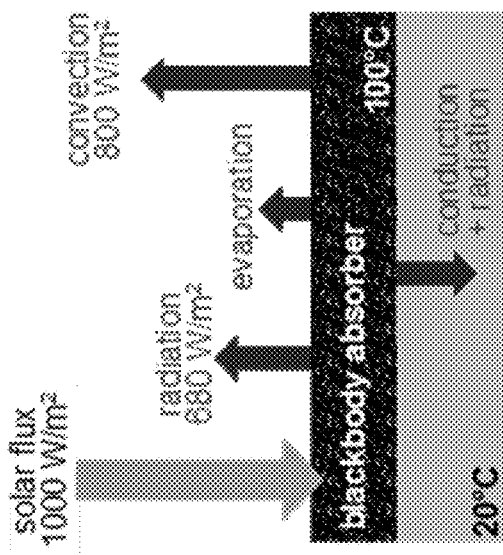
FIG. 8C shows a perspective view of a localized heating structure according to embodiments of the present invention.
Figure 8D:
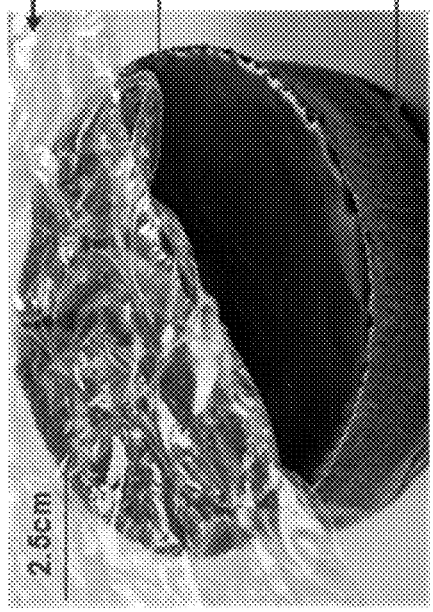
FIG. 8D is a graph showing thermal radiative losses for an ideal body and the localized heating structure shown in FIG. 8C.

FIG. 8A shows the energy balance and heat transfer processes involved in a floating solar steam generator, including radiative and convective heat loss to the ambient and conductive and radiative heat loss to the underlying water, for a blackbody solar receiver operating at 100° C. The 1000 W/m$^2$ delivered by the ambient solar flux is not enough to sustain the heat losses, and a 100° C. equilibrium temperature cannot be reached. FIG. 8B shows the energy balance and heat transfer processes in the heating structure shown in FIG. 8C according to embodiments of the present invention. FIG. 8C is a photograph of a heating structure 30 including a spectrally-selective solar absorber 34 having a spectrally-selective coating on a copper substrate to suppress radiative losses and to thermally concentrate heat to the evaporation region. The convective cover 36 includes a thermally insulating bubblewrap cover that transmits sunlight and minimizes convective losses. Slots were cut in the bubblewrap to allow steam to escape. The thermally insulating layer 32 is an insulating polymer foam that insulates the hot spectrally-selective solar absorber 34 with its copper heat-spreading layer from the cool underlying water, and floats the entire structure 30. FIG. 8D compares thermal radiative losses at 100° C. from a blackbody and the spectrally-selective solar absorber 34 shown in FIG. 8C.

Example 2

Figure 9A:
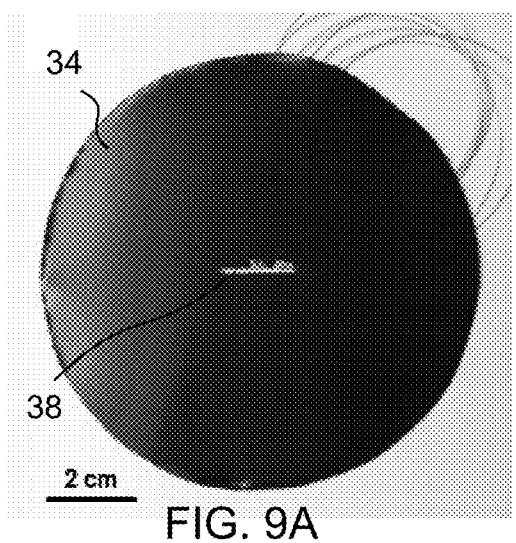
FIGS. 9A and 9B show top and perspective views, respectively, of a localized heating structure according to embodiments of the present invention.
Figure 9C:
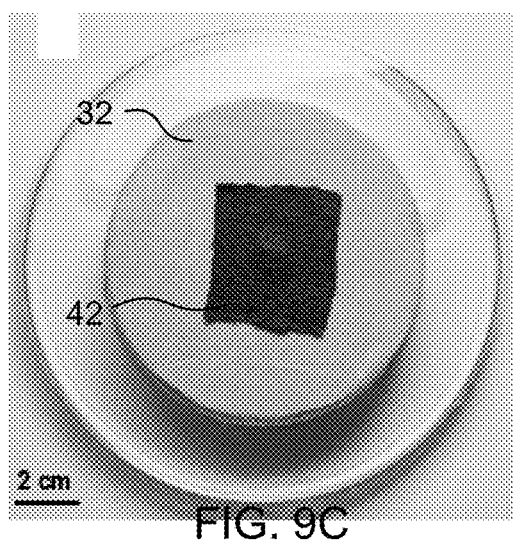
FIG. 9C shows a top view of a thermally insulating layer according to embodiments of the present invention.
Figure 9B:
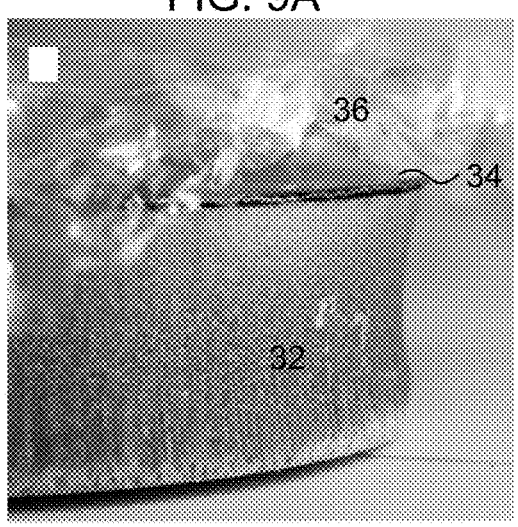
Figure 9D:
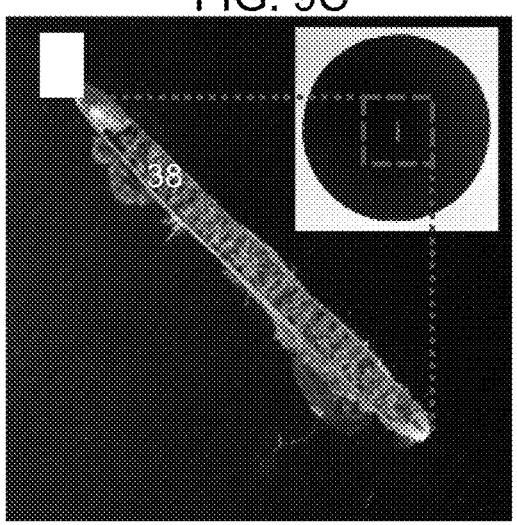
FIG. 9D shows a top view of an evaporation opening according to embodiments of the present invention.
Figures 10A, 10B:
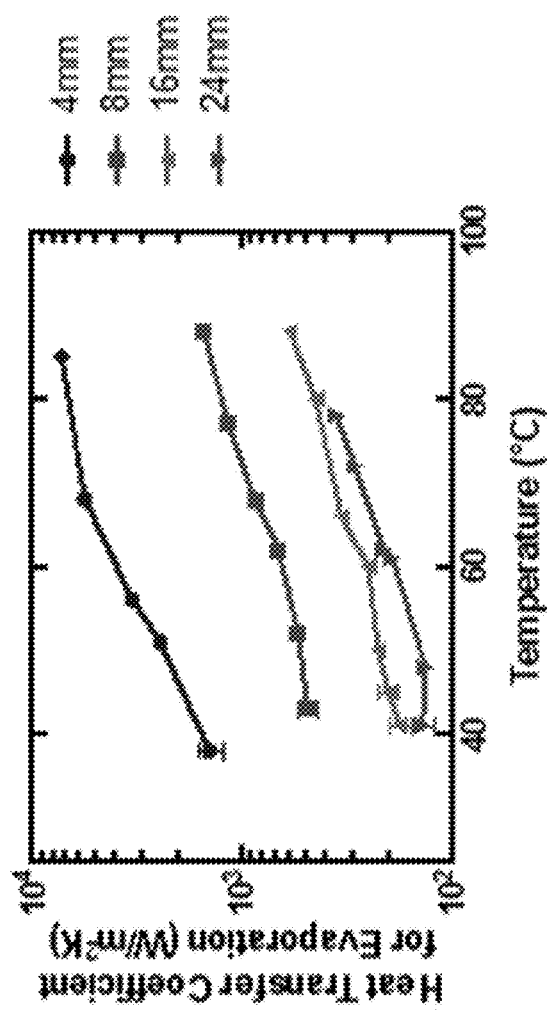
FIG. 10A is a graph showing the evaporation heat transfer coefficient for localized heating structures with various sized evaporation layer areas.
FIG. 10B shows a perspective view of one of the localized heating structures measured in FIG. 10A.

FIGS. 9A-9D show a lab-scale heating structure 30. Low-cost commercial materials were used to construct the heating structure 30, and even cheaper materials may be substituted for specific applications, e.g., using alternative selective coatings or replacing the copper film with an aluminum foil. The spectrally-selective solar absorber 34 was formed from a cermet (BlueTec eta plus) coated on a thermally-conductive copper substrate, as shown in FIGS. 9A and 9B. The spectrally-selective solar absorber 34 solar absorptance ($\alpha$=0.93) and emittance at 100° C. ($\varepsilon$=0.07) were both measured. The thermal conductivity of copper is estimated to be 400 W/mK. The thermally insulating layer 32 was constructed from a polystyrene foam disk, as shown in FIGS. 9B and 9C, which is a thermal insulator (k=~0.03 W/m-K) and serves to float the entire structure on a body of water, and limits the thermal conduction and radiation to the cool water underneath. A channel 38 was drilled through the foam, and a hydrophilic cotton evaporation wick 40 was threaded through. The evaporation wick 40 was formed from a cotton fabric. The evaporation wick 40 tunnels through the thermally insulating layer 32 to the underlying water and draws water through the thermally insulating layer 32 by capillary forces that deliver water to the spectrally-selective solar absorber 34. An evaporation layer 42 was formed from a sheet of cotton fabric (shown as the dark square in the center of the thermally insulating layer 32 in FIG. 9C) and was placed above the evaporation wick 40 on the foam to increase the evaporative area. A convective cover 36 was made from a sheet of large transparent bubble wrap, such as shown in FIG. 9B, and was placed on top of the spectrally-selective solar absorber 34 to minimize the convective losses. The solar transmittance $\tau$ of the bubble wrap was measured to be 80%. Though the bubble wrap reduces the solar power transmitted and absorbed by the spectrally-selective solar absorber 34 surface, the bubble wrap also reduces the convective heat losses. The result is a net improvement in the heating structure 30 performance. FIG. 9D shows an evaporation opening 38, cut into a 10 cm diameter spectrally-selective solar absorber 34, that allows for water vapor to escape. The evaporation opening 38 was varied in length, with 1 mm width, to control the operating temperature of the heating structure 30. For smaller thermal concentrations, 2-3 openings 38 were made in a concentrated cluster (~5-10 mm separation). The evaporation opening 38, which reveals the evaporation layer 42 underneath, serves to deliver water, but also to increase the evaporation area. The insert in FIG. 9D shows where the evaporation opening 38 was cut in the spectrally-selective solar absorber 34.

Example 3

To understand and quantify the dependence of evaporation heat transfer coefficient on the area of evaporation, the evaporation rate per area was experimentally measured for various evaporation layer 42 surface areas. These evaporation surfaces were created using a cotton fabric and shaped as circles with diameters from 4 mm to 24 mm. The evaporation heat transfer coefficient studies were carried out using small containers filled with water, such as shown in FIG. 10B. The evaporation layer 42 was formed from a cotton fabric that wicked the water to the surface to ensure good water-air contact for evaporation. The evaporation heat transfer coefficients were measured, and the results are shown in FIG. 10A. FIG. 10B shows the experimental set up for an evaporation layer 42 surface area of 24 mm. As shown in FIG. 10A, for smaller evaporation layer 42 areas, the evaporation heat transfer coefficient increases drastically, taking advantage of the better vapor diffusion geometries.

Example 4

Figure 11A:
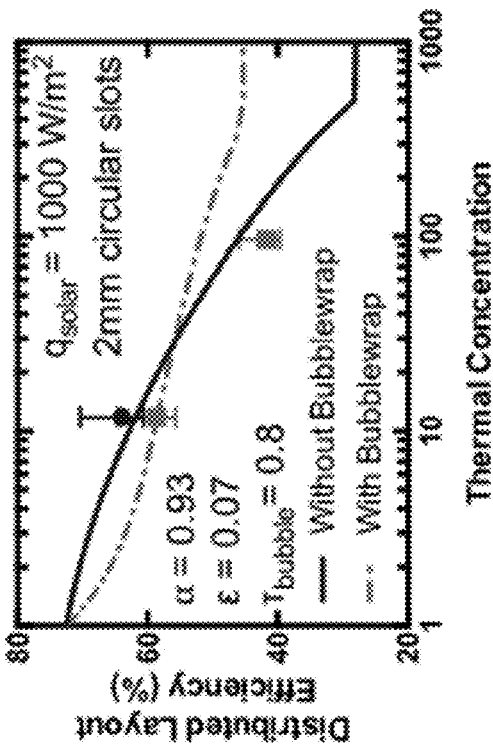
FIG. 11A is a graph showing efficiency of vapor generation as a function of thermal concentration for a localized heating structure with a repeating pattern of evaporation openings according to embodiments of the present invention.

For high efficiency vapor generation, the heating structure 30 was formed by evenly distributing a plurality of evaporation openings 38, each opening having a 2 mm diameter, throughout the entire spectrally-selective solar absorber 34 area. The heating structure 30 was then operated with and without the thermally insulating layer 32 formed from bubblewrap, to see the effect of vapor diffusion on evaporation efficiency. An Isothermal Model was developed using evaporation heat transfer coefficients measured with the distributed holes 38. The evaporation heat transfer coefficients were obtained by illuminating the heating structure 30 with different numbers (27 and 220) of distributed 2 mm diameter holes. These coefficients were then used in the Isothermal Model. The measured data points and predicted efficiencies are shown in FIG. 11A, and FIG. 11B shows the 100× thermal concentration heating structure with 27×2 mm diameter holes. The holes were drilled using a drill press. FIG. 11A shows high efficiency vapor generation for a heating structure 30 with distributed 2 mm circular slots for evaporation openings 38. The lines show the Isothermal Model predictions utilizing the measured evaporation coefficients for the distributed holes. The solid line shows the case where the convective cover 36 bubblewrap is removed. The dashed line shows when the convective cover 36 bubblewrap is present. As shown, the convective cover 36 bubblewrap is useful at higher thermal concentrations, due to higher operating temperatures. At low thermal concentrations, the convective cover 36 bubblewrap's reduced solar transmission negatively impacts performance.

Embodiments of the localized heating structure 10, 30, 50 and the volumetric absorber 20 have the potential to be utilized in a number of applications. For example, embodiments may be used in evaporative ponds for enhanced evaporation. These ponds are used for desalination, mineral extraction, hazardous waste collection, agricultural water treatment. High evaporation rate in these ponds has both economic (fast processing) and environmental (land use) advantages. In addition, embodiments may be used in solar collectors for domestic water heating with up to 30% higher efficiency than the current technologies. Embodiments may boost the maximum temperature of water in these collectors and decrease the surface area of these collectors. Embodiments may also be used in superheated vapor generation systems, such as power plants, distillation systems, and sterilizing systems. Currently, most of these systems function with fossil fuels or electricity. Embodiments provide an efficient approach to utilize solar energy in these systems.

Although the above discussion discloses various exemplary embodiments of the invention, it should be apparent that those skilled in the art may make various modifications that will achieve some of the advantages of the invention without departing from the true scope of the invention.

What is claimed is:

1. A localized heating structure for use in solar thermal systems, the structure comprising:
    a spectrally-selective solar absorber configured to absorb incident solar radiation and to reflect at wavelengths longer than about 2μm, with an underlying heat-spreading layer having a thermal conductivity equal to or greater than about 50W/(mK);
    a thermally insulating layer adjacent to the underlying heat-spreading layer in the spectrally-selective solar absorber, such that the heat-spreading layer is between the thermally insulating layer and the spectrally-selective solar absorber, the thermally insulating layer having a thermal conductivity of less than about 0.1W/(mK);
    at least one or more evaporation openings extending through both the spectrally-selective solar absorber and through the thermally insulating layer; and
    an evaporation wick disposed in one or more of the evaporation openings in the thermally insulating layer, the evaporation wick configured to contact liquid and to allow the liquid to be transported from a location beneath the thermally insulating layer through to the spectrally-selective solar absorber in order to generate vapor from the liquid, the localized heating structure configured to allow the vapor to escape through the at least one or more evaporation openings in the spectrally-selective solar absorber, the thermally insulating layer configured to have a density less than the liquid so that the localized heating structure is able to float on the liquid.

2. The localized heating structure of claim 1, wherein the spectrally-selective solar absorber comprises a cermet layer coated on the underlying heat-spreading layer, and the underlying heat-spreading layer includes a metal substrate.

3. The localized heating structure of claim 2, wherein the metal substrate comprises a copper substrate or an aluminum foil.

4. The localized heating structure of claim 1, wherein the evaporation wick comprises a cotton material.

5. The localized heating structure of claim 1, wherein the thermally insulating layer comprises a polymer material.

6. The localized heating structure of claim 5, wherein the polymer material comprises a polystyrene foam, a polymer bubblewrap, a polymer aerogel, or combinations thereof.

7. The localized heating structure of claim 1, wherein the thermally insulating layer comprises a silica aerogel.

8. The localized heating structure of claim 1, wherein the at least one or more evaporation openings comprise two or more evaporation openings distributed throughout the spectrally-selective solar absorber and the thermally insulating layer.

9. The localized heating structure of claim 8, wherein one evaporation wick is disposed in each of the evaporation openings.

10. The localized heating structure of claim 1, further comprising a convective cover adjacent to the spectrally-selective solar absorber so that the spectrally-selective solar absorber is between the convective cover and the thermally insulating layer.

11. The localized heating structure of claim 10, wherein the convective cover comprises a polymer layer comprising bubblewrap.

12. The localized heating structure of claim 10, wherein the convective cover comprises an aerogel layer.

13. The localized heating structure of claim 1, further comprising an evaporation layer in contact with the evaporation wick and disposed between the spectrally-selective solar absorber and the thermally insulating layer, the evaporation layer configured to allow the liquid to be transported from the evaporation wick to the evaporation layer.

14. The localized heating structure of claim 13, wherein the evaporation layer comprises a cotton material.

15. The localized heating structure of claim 1, further comprising an anti-fouling coating adjacent to the thermally insulating layer so that the thermally insulating layer is between the spectrally-selective solar absorber and the anti-fouling coating.

16. The localized heating structure of claim 1, further comprising a suspension configured to hold the spectrally-selective solar absorber above the liquid so that the thermally insulating layer is not directly contacting the liquid.

* * * * *